US012485782B2

(12) United States Patent
Kim

(10) Patent No.: US 12,485,782 B2
(45) Date of Patent: Dec. 2, 2025

(54) POWER SUPPLY SYSTEM FOR URBAN AIR MOBILITY

(71) Applicants: Hyundai Motor Company, Seoul (KR); Kia Corporation, Seoul (KR)

(72) Inventor: Kyoung Joo Kim, Goyang-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 705 days.

(21) Appl. No.: 17/943,424

(22) Filed: Sep. 13, 2022

(65) Prior Publication Data

US 2023/0132623 A1    May 4, 2023

(30) Foreign Application Priority Data

Nov. 1, 2021  (KR) .................. 10-2021-0147865

(51) Int. Cl.
| | |
|---|---|
| *B60L 53/18* | (2019.01) |
| *B64D 27/34* | (2024.01) |
| *B64D 27/357* | (2024.01) |
| *B64U 50/19* | (2023.01) |
| *B64U 50/34* | (2023.01) |
| *B64U 10/13* | (2023.01) |

(52) U.S. Cl.
CPC .............. *B60L 53/18* (2019.02); *B64D 27/34* (2024.01); *B64D 27/357* (2024.01); *B64U 50/19* (2023.01); *B64U 50/34* (2023.01); *B64U 10/13* (2023.01)

(58) Field of Classification Search
CPC ......... B60L 53/18; B64U 50/19; B64U 50/34; B64U 10/13; B64D 27/34; B64D 27/357
USPC ......................................................... 320/109
See application file for complete search history.

(56) References Cited

U.S. PATENT DOCUMENTS

| | | | |
|---|---|---|---|
| 10,029,803 B1 * | 7/2018 | Larsen | ................... B64U 50/39 |
| 11,945,601 B2 * | 4/2024 | Pitman | ................ H02J 7/00032 |

FOREIGN PATENT DOCUMENTS

| | | |
|---|---|---|
| KR | 10-1373850 | 3/2014 |
| KR | 10-2150856 | 9/2020 |

* cited by examiner

*Primary Examiner* — Nathaniel R Pelton
(74) *Attorney, Agent, or Firm* — MORGAN, LEWIS & BOCKIUS LLP

(57) ABSTRACT

A power supply system for an urban air mobility (UAM) device includes a charging station provided on the ground and including a power cable for supplying power, a UAM power supply mobility device configured to be anchored at the charging station and provided with the power to charge a battery therein or to supply the power to the UAM device separated from the charging station using the power cable while flying with the UAM device, and an auxiliary mobility device configured to control a path of the power cable to keep the power cable in a preset space while flying between the charging station and the UAM power supply mobility device.

23 Claims, 16 Drawing Sheets

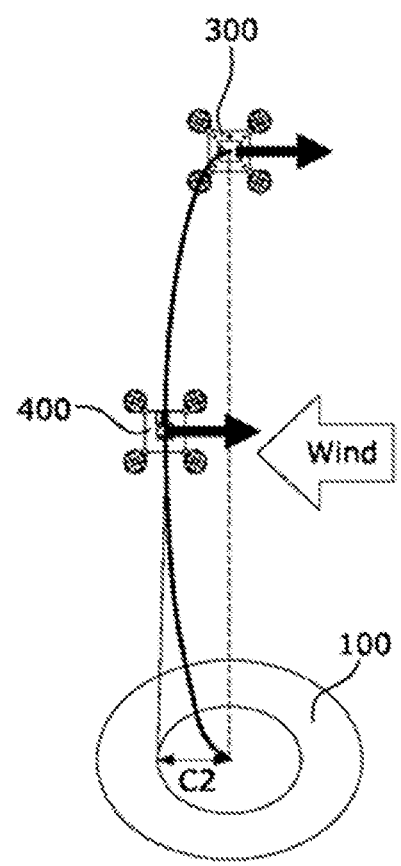

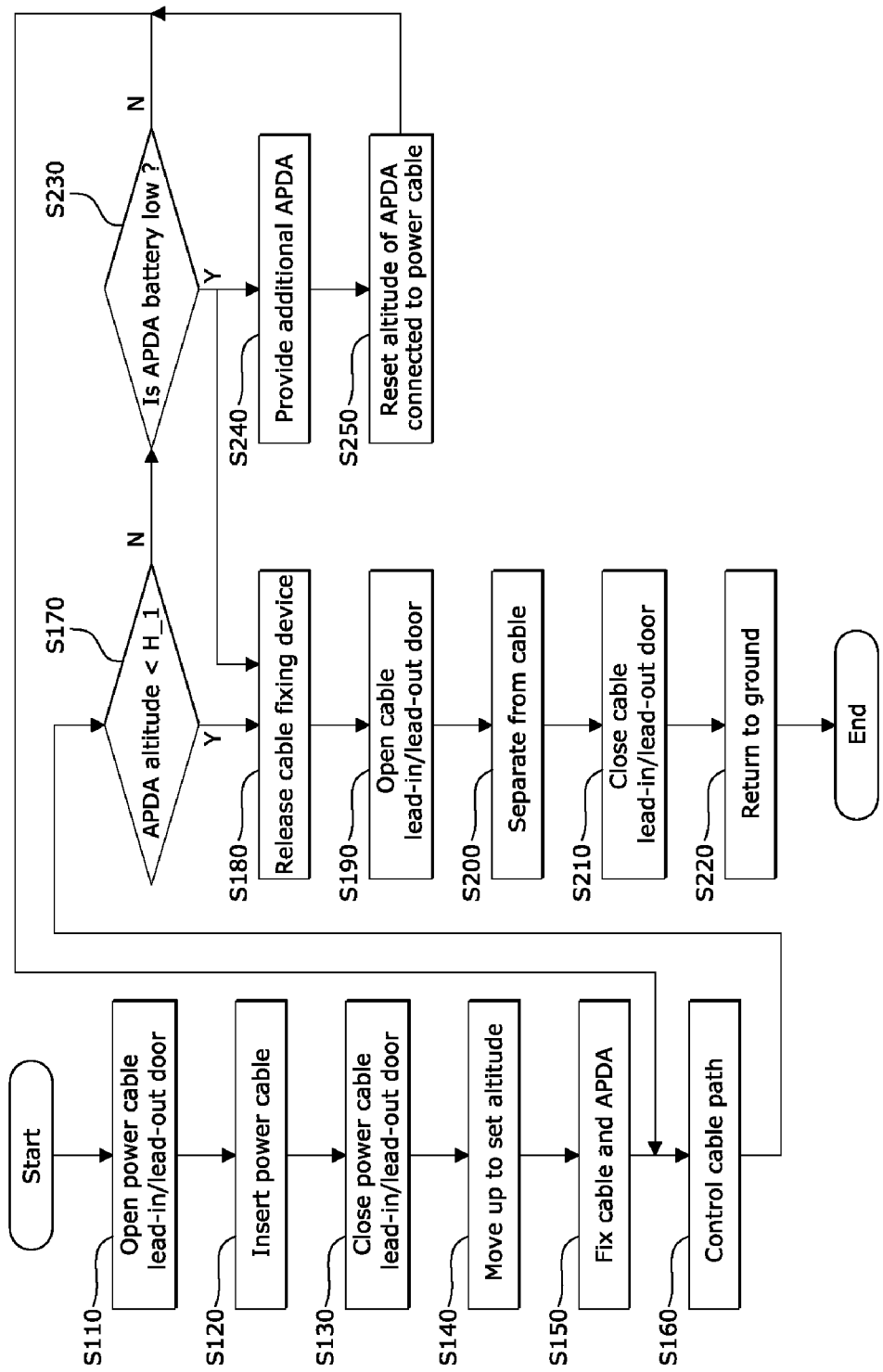

POWER SUPPLY SYSTEM FOR URBAN AIR MOBILITY

CROSS-REFERENCE TO RELATED APPLICATION

The present application claims priority to Korean Patent Application No. 10-2021-0147865, filed on Nov. 1, 2021, the entire contents of which is incorporated herein for all purposes by this reference.

BACKGROUND OF THE PRESENT DISCLOSURE

Field of the Present Disclosure

The present disclosure relates to a power supply system for an urban air mobility (UAM) device which can supply power to the UAM device by being connected to the UAM device during takeoff and stably return to the ground by separating a power cable from the UAM device after completion of takeoff.

Description of Related Art

Urban air mobility (UAM), a short-distance urban mobility system, is a flying means that vertically takes off from a city center, moves to a destination, and then vertically lands at the destination.

If a UAM device is powered by a battery without using a conventional fossil fuel, a large number of batteries needs to be loaded in the UAM device for taking off, landing, and operating for a long time, but battery capacity increase causes the weight of the UAM device to increase and thus more batteries need to be mounted for the heavy UAM device.

A UAM device, an electric airplane with vertical take-off and landing features that can accommodate multiple people, requires a method for increasing energy density while reducing a battery weight for efficient operation.

The UAM device consumes more energy during takeoff than during flight. When the UAM device includes a fuselage and a battery that supplies power to the UAM device, it has a considerable weight and requires tremendous energy to take off to an operational altitude (500 to 600 m).

Because the UAM device consumes a great amount of energy only to gain height in place, as described above, there is a problem that the overall flight distance is shortened.

Furthermore, a related art proposes a method of supplying power to an aircraft from the ground by connecting an external cable to the aircraft. However, the technology of the related art is not suitable for application to an aircraft that needs to be used for long-distance operation, such as a UAM device, because it relates to a device that continuously supplies power to an aircraft from the ground because the aircraft does not have its own energy source.

The information included in this Background of the present disclosure is only for enhancement of understanding of the general background of the present disclosure and may not be taken as an acknowledgement or any form of suggestion that this information forms the prior art already known to a person skilled in the art.

BRIEF SUMMARY

Various aspects of the present disclosure are directed to providing an external power supply system configured for supplying power by being connected to a UAM device during takeoff and stably returning the UAM device to the ground by removing a power cable from the UAM device after takeoff is completed.

The technical problems to be achieved in an exemplary embodiment of the present disclosure are not limited to the technical problems mentioned above, and other technical problems that are not mentioned will be clearly understood by those skilled in the art to which an exemplary embodiment of the present disclosure belongs from the description below.

To achieve these objects and other advantages and in accordance with the purpose of the present disclosure, as embodied and broadly described herein, a power supply system for an urban air mobility (UAM) device includes a charging station provided on the ground and including a power cable for supplying power, a UAM power supply mobility device configured to be anchored at the charging station and provided with the power to charge a battery therein or to supply the power to the UAM device separated from the charging station using the power cable while flying with the UAM device, and an auxiliary mobility device configured to control a path of the power cable such that the power cable does not deviate from a preset space while flying between the charging station and the UAM power supply mobility device.

In another aspect of the present disclosure, a method for supplying power to a UAM device while the UAM device is separated from a charging station and takes off includes electrically connecting a UAM power supply mobility device to the UAM device, allowing the UAM power supply mobility device to take off such that the UAM power supply mobility device flies along with the UAM device separated from the charging station, supplying the power to the UAM device using a power cable mounted on the UAM power supply mobility device ascending with the UAM device until reaching a position in a preset space, and controlling a path of the power cable so that the power cable does not deviate from the preset space during flight between the charging station and the UAM power supply mobility device.

The methods and apparatuses of the present disclosure have other features and advantages which will be apparent from or are set forth in more detail in the accompanying drawings, which are incorporated herein, and the following Detailed Description, which together serve to explain certain principles of the present disclosure.

BRIEF DESCRIPTION OF THE DRAWINGS

FIG. 11A, FIG. 11B and FIG. 11C are diagrams illustrating operations of a plurality of auxiliary mobility devices according to various exemplary embodiments of the present disclosure;

FIG. 14 is a diagram illustrating the operation of the auxiliary mobility device according to various exemplary embodiments of the present disclosure.

Figure 1:
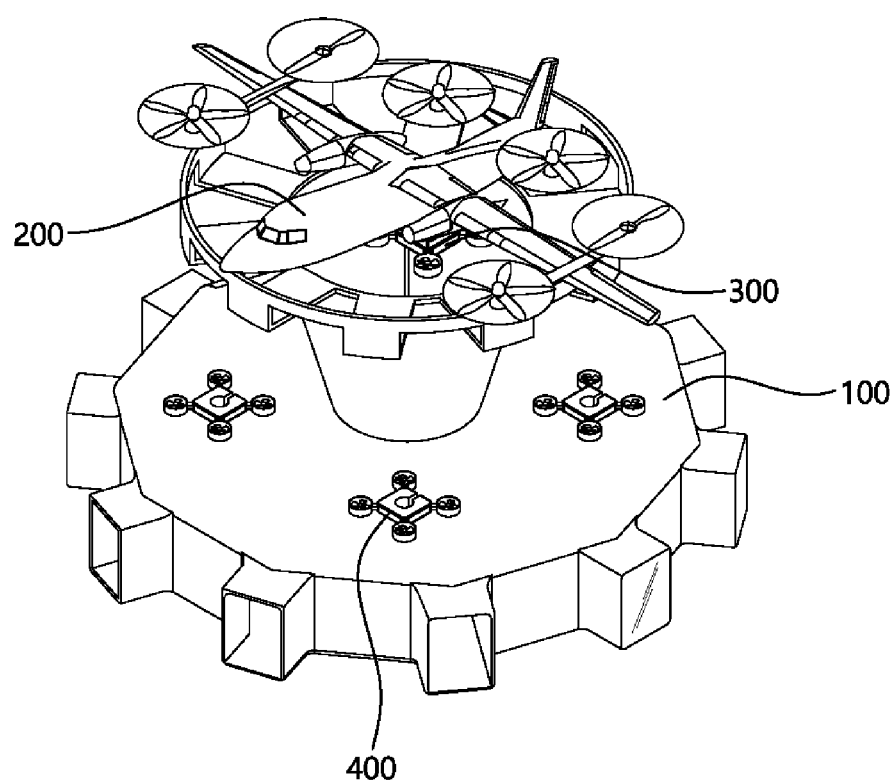
FIG. 1 is a diagram illustrating a UAM power supply system according to various exemplary embodiments of the present disclosure.

It may be understood that the appended drawings are not necessarily to scale, presenting a somewhat simplified representation of various features illustrative of the basic principles of the present disclosure. The specific design features of the present disclosure as disclosed herein, including, for example, specific dimensions, orientations, locations, and shapes will be determined in part by the particularly intended application and use environment.

In the figures, reference numbers refer to the same or equivalent parts of the present disclosure throughout the several figures of the drawing.

DETAILED DESCRIPTION

Reference will now be made in detail to various embodiments of the present disclosure(s), examples of which are illustrated in the accompanying drawings and described below. While the present disclosure(s) will be described in conjunction with exemplary embodiments of the present disclosure, it will be understood that the present description is not intended to limit the present disclosure(s) to those exemplary embodiments of the present disclosure. On the other hand, the present disclosure(s) is/are intended to cover not only the exemplary embodiments of the present disclosure, but also various alternatives, modifications, equivalents and other embodiments, which may be included within the spirit and scope of the present disclosure as defined by the appended claims.

Hereinafter, embodiments of the present disclosure will be described in detail with reference to the accompanying drawings so that those of ordinary skill in the art can easily implement the same. However, the present disclosure may be implemented in various different forms and is not limited to the embodiments described herein. In order to clearly describe the present disclosure in the drawings, parts irrelevant to the description are omitted and similar reference numerals are attached to similar parts throughout the specification.

Throughout the specification, when a part "includes" a certain component, this means that other components may be further included, rather than excluding other components, unless otherwise stated. In addition, parts indicated by the same reference numerals throughout the specification refer to the same components.

In addition, a unit or a control unit included in terms such as a mobility control unit (MCU) is only a term widely used in the naming of a controller that controls a specific function of air mobility and does not imply a generic function unit. For example, each controller may include a communication device that communicates with other controllers or sensors to control the function of the controller, a memory that stores an operating system or logic commands, input/output information, and the like, and one or more processors that perform determination, operation, and decision necessary for controlling the function.

Figure 2:
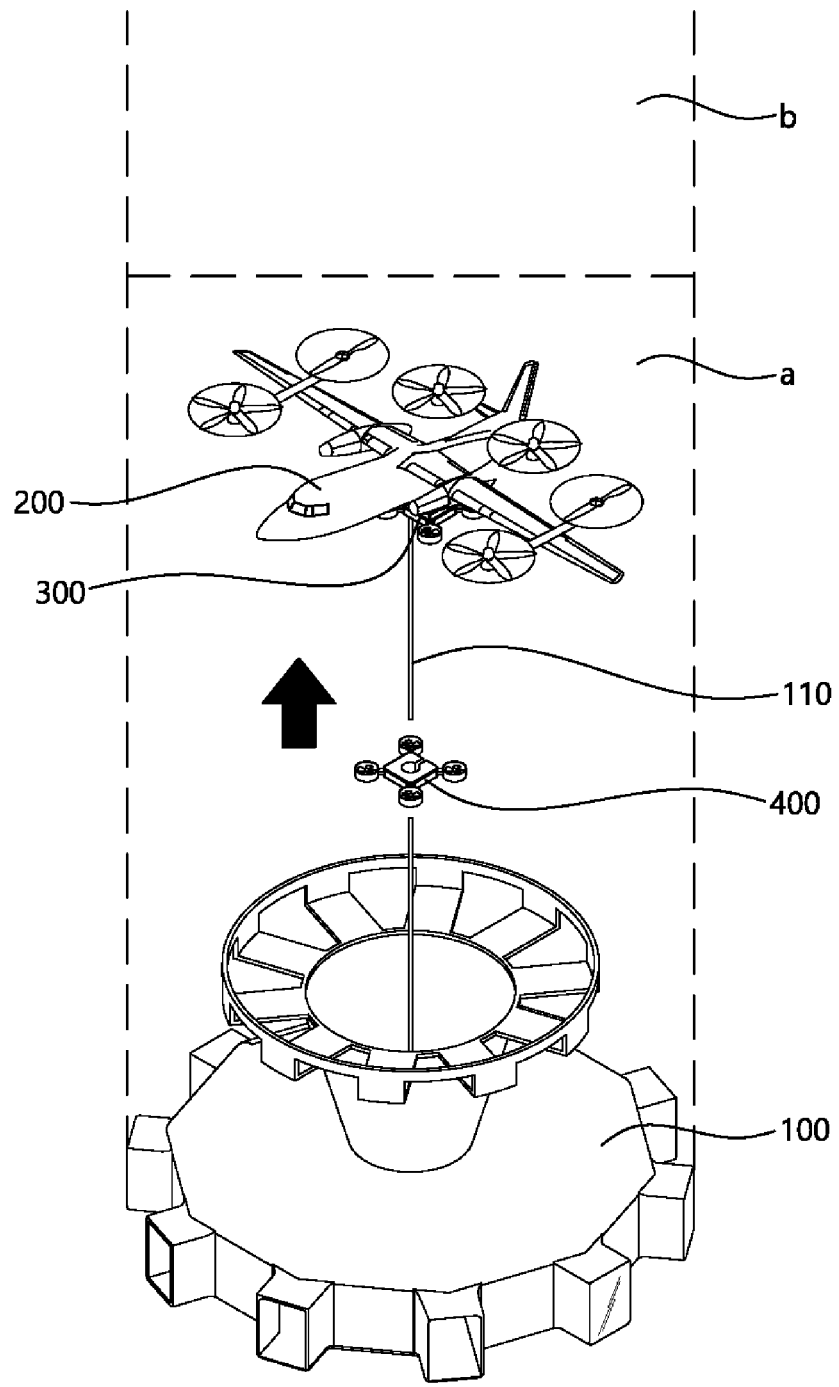
FIG. 2 and FIG. 3 are diagrams illustrating the operation of the UAM power supply system according to various exemplary embodiments of the present disclosure.
Figure 3:
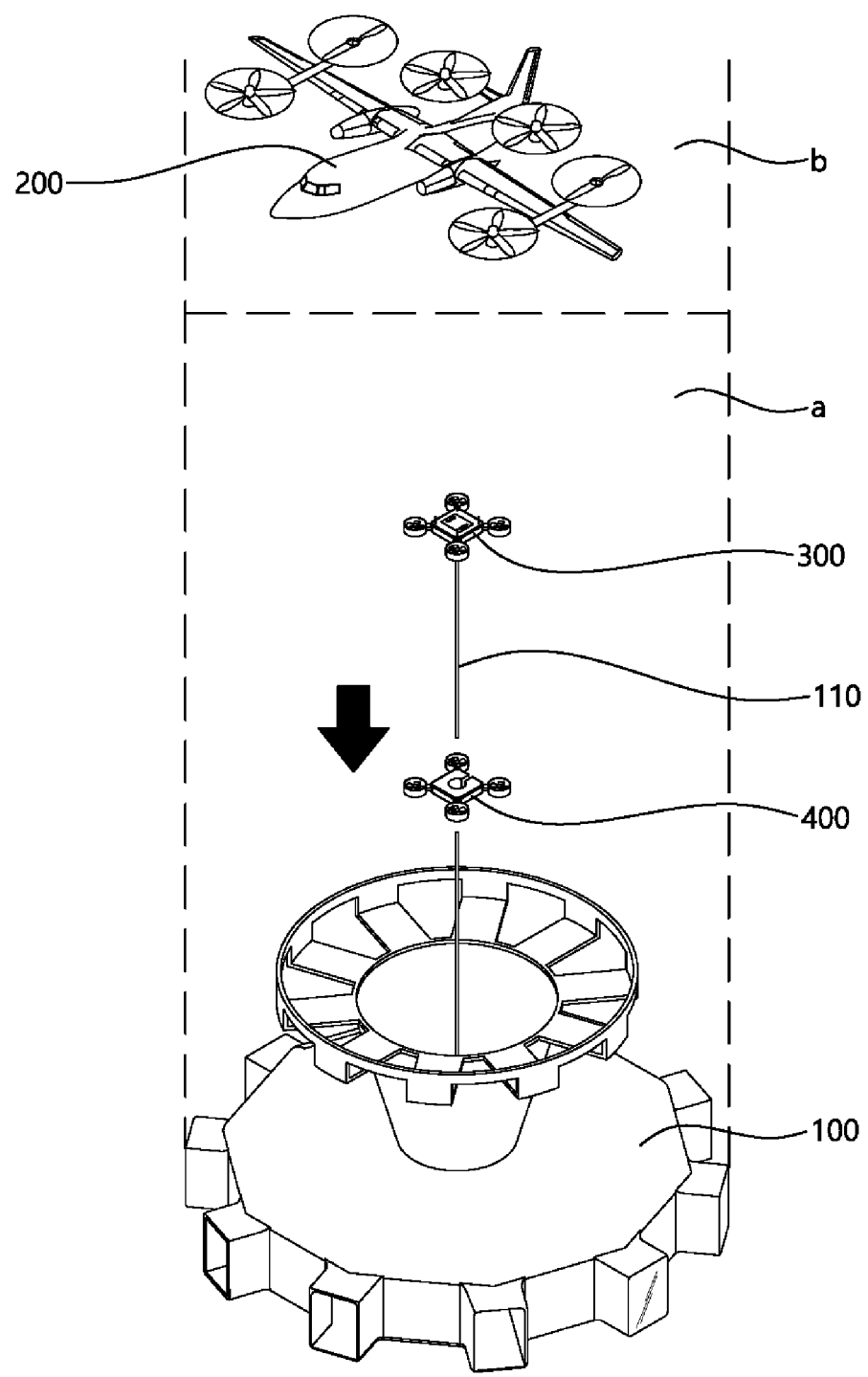

FIG. 1 is a diagram illustrating a UAM power supply system according to various exemplary embodiments of the present disclosure and FIG. 2 and FIG. 3 are diagrams illustrating an operation of the UAM power supply system according to various exemplary embodiments of the present disclosure.

Referring to FIG. 1 to FIG. 3, the UAM power supply system according to various exemplary embodiments of the present disclosure may include a charging station 100, an urban air mobility (UAM) device 200, a UAM power supply mobility device 300, and an auxiliary mobility device 400.

The charging station 100 is provided on the ground and may include a power cable 110 having a predetermined length. The power cable 110 may be used to supply power to the UAM device 200 through the UAM power supply mobility device 300 electrically connected thereto under the control of the charging station 100.

Although not shown, the charging station 100 may include a communication module and a charging processor. The communication module may transmit position information or flight information to a communication module of the UAM power supply mobility device 300 and a communication module of the auxiliary mobility device 400 under the control of the charging processor. For example, the charging station 100 may unwind or wind a power cable 110 based on the position information and the flight information of the UAM power supply mobility device 300 received from the UAM power supply mobility device 300.

Alternatively, the charging station 100 may control at least one auxiliary mobility device 400 so that it flies to control a path of the power cable 110 based on the position information and the flight information of the UAM power supply mobility device 300 received from the UAM power supply mobility device 300. Detailed description thereof will be provided later.

The UAM device 200 may be an aircraft that can fly freely in the sky and can take off and land vertically even in a narrow space. The UAM device 200 is urban air mobility device and may be defined as an aircraft in which an individual or a large number of passengers can freely fly in the sky in the city center. The UAM device 200 may be a concept including various manned/unmanned aerial vehicles that require vertical takeoff and landing, such as drones. The UAM device 200 may be referred to as a vertical takeoff and landing multicopter.

The UAM device 200 may include one or more rotors because boarding/deboarding in the city center should be fast and comfortable. When at least one of the rotors provided in the UAM device 200 malfunctions, flight balance may be controlled through the remaining rotors. That is, distributed electric propulsion (DEP) for independently driving multiple rotors may be applied to the UAM device 200 for noise reduction and accident prevention.

DEP allows multiple rotors to be driven independently with power or electrical energy generated by a single battery. Even if an individual rotor malfunctions, other rotors are continuously driven because DEP is applied to the UAM device 200 and thus the UAM device 200 can safely fly. Furthermore, the UAM device 200 utilizes smaller rotors than a helicopter and operates only necessary rotors in accordance with flight conditions such as takeoff, landing, and flying, and thus noise generation may be minimized.

The UAM power supply mobility device 300 includes at least one rotor and can fly in the sky using the rotor. The UAM power supply mobility device 300 is electrically and physically connected to the power cable 110 and can supply power to the UAM device 200 which is grounded or is flying using the power cable 110. For example, the UAM power supply mobility device 300 may be provided between the charging station 100 and the UAM device 200 mounted or anchored in the charging station 100 and supply power to the UAM device 200. The UAM power supply mobility device 300 may be referred to as an auxiliary power drone (APD).

The auxiliary mobility device 400 includes at least one rotor and can fly in the sky using the rotor. At least one auxiliary mobility device 400 may fly so that it is physically connected to or separated from the power cable 110 located in a preset space. The auxiliary mobility device 400 may be referred to as an auxiliary power drone assist (APDA). A detailed description thereof will be provided later.

Distributed electric propulsion (DEP) for independently driving multiple rotors for noise reduction and accident prevention may also be applied to the UAM power supply mobility device 300 and auxiliary mobility device 400.

Referring to FIG. 2, the UAM power supply mobility device 300 may be mounted on the UAM device 200 flying in a preset space and supply power to the UAM device 200 while flying with the UAM device 200. That is, the UAM power supply mobility device 300 may be mounted on the UAM device 200 and ascend to supply power to the UAM device 200 until the UAM device 200 removed from the charging station 100 reaches a position in a preset space a in the air.

The charging station 100 may control the power cable 110 so that the power cable 110 continues to be unwound based on position information and flight information of the UAM power supply mobility device 300 received from the UAM power supply mobility device 300 until the UAM device 200 is removed from the charging station 100 and reaches a position in the preset space a in the air. Accordingly, the UAM power supply mobility device 300 may stably supply power to the UAM device 200.

Furthermore, the charging station 100 may determine or predict a path of the power cable 110 located in a preset space based on position information and flight information of the UAM power supply mobility device 300 received from the UAM power supply mobility device 300 which is ascending.

Referring to FIG. 3, the UAM power supply mobility device 300 may be separated from the UAM device 200 and descend to be mounted on the charging station 100 when the UAM device 200 flies into a space b outside the preset space a.

The UAM power supply mobility device 300 may include a fixing portion that can securely fix the power cable 110 to prevent the power cable 110 from being arbitrarily detached or separated from the UAM power supply mobility device 300.

Furthermore, the charging station 100 may receive position information and flight information of the UAM power supply mobility device 300 in real time from the UAM power supply mobility device 300 that has been separated from the UAM device 200 flying in the space b out of the preset space a and control the power cable 110 such that it is gradually wound based on the position information and the flight information, as shown in FIG. 3.

Furthermore, the charging station 100 may determine or predict a path of the power cable 110 located in a preset space based on position information and flight information of the UAM power supply mobility device 300 received from the UAM power supply mobility device 300 which is descending.

As described above, the charging station 100 may determine whether the auxiliary mobility device 400 is flying based on the determined path of the power cable 110. For example, when the power cable 110 deviates from a preset space, the charging station 100 may cause at least one auxiliary mobility device 400 to take off and control the path of the power cable 110.

Accordingly, the auxiliary mobility device 400 may prevent the power cable 110 from being separated from the preset space a during ascending flight or descending flight under the control of the charging station 100.

Figure 4:
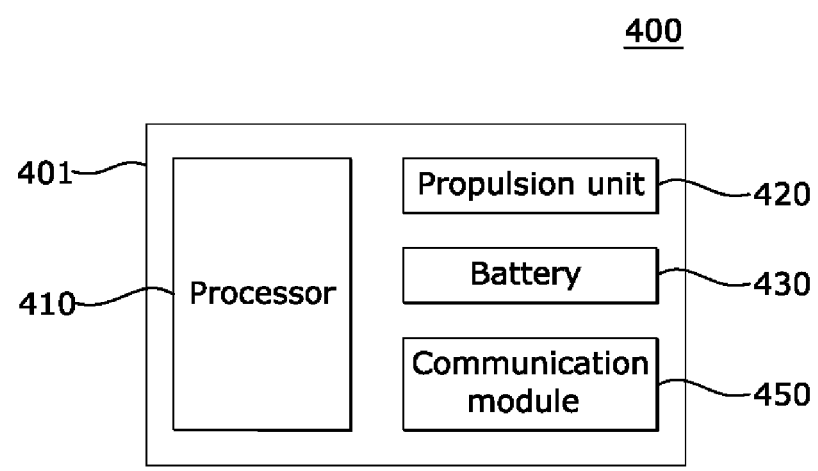
FIG. 4 is a diagram illustrating a configuration of auxiliary vehicle according to various exemplary embodiments of the present disclosure.

FIG. 4 is a block diagram illustrating the configuration of the auxiliary mobility device according to various exemplary embodiments of the present disclosure.

Referring to FIG. 4, the auxiliary mobility device 400 according to various exemplary embodiments of the present disclosure may include a body 401, a processor 410, a propulsion unit 420, a battery 430, and a communication module 350. The present disclosure is not limited thereto, and components may be omitted or added as necessary.

The body 401 has a predetermined internal space and may be formed to a predetermined thickness. For example, the body 401 may be formed to have an upper surface, a lower surface, and four sides (or lateral surfaces). The present disclosure is not limited thereto and the body 401 may have any shape as long as it can securely fasten or mount a plurality of propulsion units 420, which will be described later.

Figure 5:
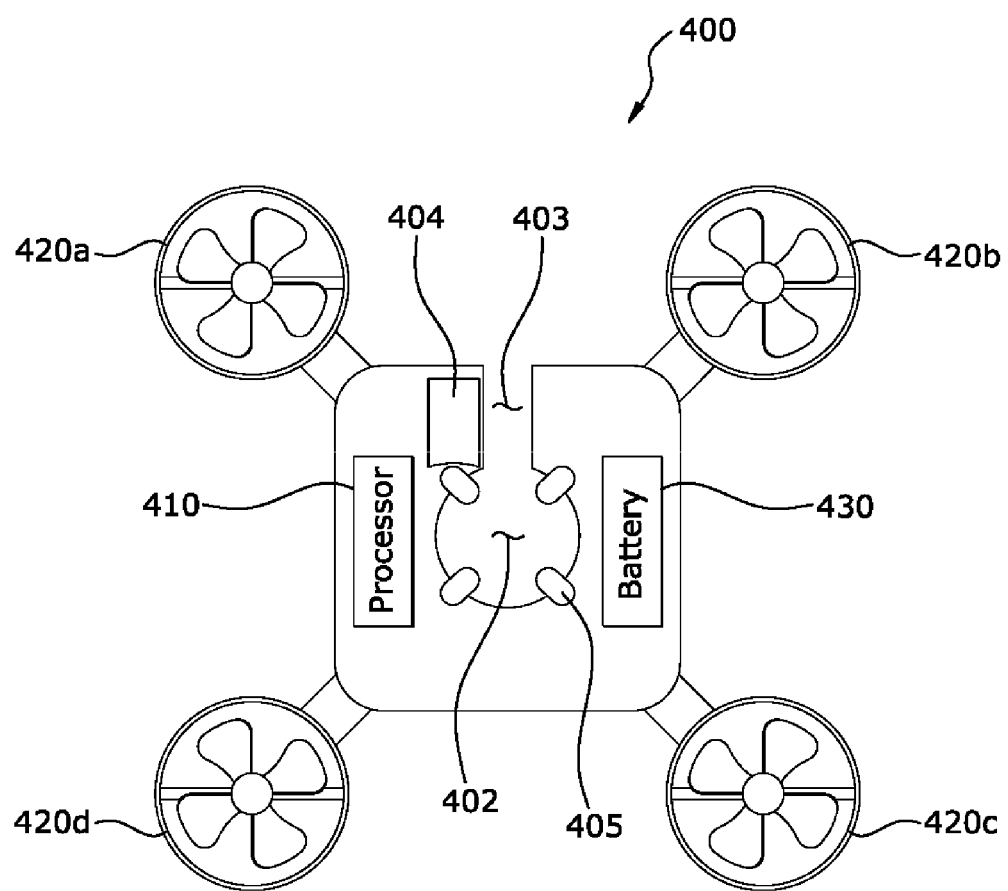
FIG. 5 is a plan view of the auxiliary mobility device according to various exemplary embodiments of the present disclosure.

The body 401 may include a cable penetrating portion 402 which is provided to penetrate the body 401 in the vertical direction to allow the power cable 110 to be provided therethrough (refer to FIG. 5), a cable lead-in/lead-out portion 403 for lead-in and lead-out of the power cable 110 (refer to FIG. 5), and a lead-in/lead-out door 404 configured for opening or closing the cable lead-in/lead-out portion 403 (refer to FIG. 5). A detailed description thereof will be provided later.

The propulsion unit 420 is provided on the circumferential surface of the body 401 and may operate to cause the auxiliary mobility device 400 to fly. The propulsion unit 420 may be referred to as a rotor. The propulsion unit 420 may operate by receiving electrical energy or power charged in the battery 430 under the control of the processor 410.

A plurality of propulsion units 420 may be provided. For example, the propulsion unit 420 includes a first rotor 420*a* (refer to FIG. 5), a second rotor 420*b* (refer to FIG. 5), a third rotor 420*c* (refer to FIG. 5), and a fourth rotor 420*d* (refer to FIG. 5). The first rotor 420*a* (refer to FIG. 5) to the fourth rotor 420*d* (refer to FIG. 5) may fly the auxiliary mobility device 400 in the ascending or descending direction or in the forward, backward, left and right directions under the control of the processor 410.

The processor 410 may be provided in the internal space of the body 401 to be electrically connected to a plurality of components mounted on the auxiliary mobility device 400. That is, the processor 410 may control a plurality of hardware or software components electrically connected to the processor 410 by executing an operating system or an application program and perform processing/operations of various types of data including data related to the propulsion unit 420. The processor 410 may be referred to as a mobility controller (MCU) or a controller.

The processor 410 may be configured as a single integrated circuit (IC). For example, the processor 410 may include a system on chip (SoC), a graphics processing unit (GPU), or the like.

The processor 410 controls the communication module 450 to execute functions of managing data links and converting communication protocols in communication between the auxiliary mobility device 400 and the charging station 100, the UAM power supply mobility device 300, or another auxiliary mobility device 400 connected through a network. The processor 410 may control data transmission/reception of the communication module 450.

The processor 410 may load a command or data received from at least one of a non-volatile memory or other components connected thereto into a volatile memory and process the same. Furthermore, the processor 410 may store data received from or generated by at least one of the other components in the nonvolatile memory.

The processor 410 having the above-described functions may control the propulsion unit 420 to draw in or draw out the power cable 110. The processor 410 may operate by receiving power from the battery 430 and control a plurality of components.

The communication module 450 may transmit flight information and position information of a device related to the auxiliary mobility device 400 to the charging station 100 and the UAM power supply mobility device 300 under the control of the processor 410. The communication module 450 may receive position information of the charging station 100 from the charging station 100. The communication module 450 may receive various types of information related to the UAM power supply mobility device 300, including flight information of the UAM power supply mobility device 300 and position information of the UAM power supply mobility device 300, from the UAM power supply mobility device 300.

The above-described communication module 450 may include a wireless communication module or an RF module.

The wireless communication module may include Wi-Fi, BT, Global Positioning System (GPS) or NFC. For example, the wireless communication module may provide a wireless communication function using a radio frequency. Additionally or alternatively, the wireless communication module may include a network interface, a modem, or the like for connecting the auxiliary mobility device 400 to a network (e.g., the Internet, a LAN, a WAN, a telecommunication network, a cellular network, a satellite network, POTS, 5G network, or the like).

The RF module is configured to transmit/receive data, for example, transmit/receive RF signals or called electronic signals. For example, the RF module may include a transceiver, a power amplifier module (PAM), a frequency filter, a low noise amplifier (LNA), or the like.

The battery 430 may store or charge power supplied from the charging station 100 under the control of the processor 410. For example, the battery 430 may include a battery cell, which is a lithium-ion battery which is formed by putting a positive electrode, a negative electrode, a separator, and an electrolyte in a rectangular aluminum case and may be charged with and discharge electrical energy, a battery module which is a battery assembly formed by putting a bundle of a predetermined number of battery cells in a frame to protect the battery cells from external shock, heat, and vibration, and a battery pack formed by mounting various control and protection systems such as a battery management system (BMS) and a cooling system in the battery module.

FIG. 5 is a plan view of the auxiliary mobility device according to various exemplary embodiments of the present disclosure.

Referring to FIG. 5, the auxiliary mobility device 400 may include the cable penetration portion 402, the cable lead-in/lead-out portion 403, the lead-in/leak-out door 404, a fixing roller 405, and the propulsion unit 420.

The cable penetrating portion 402 may penetrate the body 401 in the vertical direction so that the power cable 110 is provided therethrough. The cable penetration portion 402 may have a diameter greater than that of the power cable 110. Accordingly, the auxiliary mobility device 400 can fly in the vertical direction along the power cable 110 in a state in which the power cable 110 is accommodated into the cable penetration portion 402.

The cable lead-in/lead-out portion 403 may be physically connected to the cable penetration portion 402 to allow the power cable 110 to be drawn in or out. That is, the cable lead-in/lead-out portion 403 may be a passage connecting one side of the circumferential surface of the body 401 to the cable penetration portion 402. The cable lead-in/lead-out portion 403 may be referred to as a cable inlet.

The cable lead-in/lead-out portion 403 may have a width greater than the diameter of the power cable 110. Accordingly, the power cable 110 may be provided in the cable penetration portion 402 through the cable lead-in/lead-out portion 403.

The lead-in/lead-out door 404 may be formed to open or close the cable lead-in/lead-out portion 403 under the control of the processor 410. For example, the lead-in/lead-out door 404 may be opened when the auxiliary mobility device 400 approaches the power cable 110, and closed when the power cable 110 is accommodated into the auxiliary mobility device 400. The lead-in/lead-out door 404 may be closed when the power cable 110 is accommodated into the auxiliary mobility device 400 to prevent the power cable 110 from being arbitrarily separated from the auxiliary mobility device 400.

The lead-in/lead-out door 404 may be embedded in the auxiliary mobility device 400 in a flexible or rollable state. The present disclosure is not limited thereto, and the lead-in/lead-out door 404 may be formed in various shapes and may operate to open or close the cable lead-in/lead-out portion 403.

The fixing roller 405 is provided in the cable penetration portion 402 and may fix the power cable 110 provided or accommodated into the cable penetration portion 402. One or more fixing rollers 405 may be provided in the cable penetration portion at regular intervals 402. When the power cable 110 is provided in the cable penetration portion 402, the fixing rollers 405 may gradually move to the center portion of the cable penetration portion 402 to fix the power cable 110. The fixing roller 405 may be referred to as a cable fixing roller.

A plurality of propulsion units 420 may be provided on the circumferential surface or the side of the body 401. Although FIG. 5 illustrates that the propulsion units 420 are provided at corners between neighboring sides, the present disclosure is not limited thereto. The propulsion units 420 may be referred to as propulsion devices or rotors.

The propulsion unit 420 may include the first rotor 420a, the second rotor 420b, the third rotor 420c, and the fourth rotor 420d.

The first rotor 420a may be provided on the left front side of the upper surface of the body 401. The second rotor 420b may be provided on the right front side of the upper surface of the body 401. The third rotor 420c may be provided on the right rear side of the upper surface of the body 401. The fourth rotor 420d may be provided on the left rear side of the upper surface of the body 401.

The first rotor 420a to the fourth rotor 420d may operate individually or together under the control of the processor 410 to allow the auxiliary mobility device 400 to fly in the ascending or descending direction or in the forward, backward, left and right directions. For example, the first to fourth rotors 420a to 420d can push the air downward to generate lift or propulsion and use the lift or propulsion to allow the auxiliary mobility device 400 to fly.

FIG. 6, FIG. 7, FIG. 8, FIG. 9 and FIG. 10 are diagrams illustrating an operation in which the power cable is accommodated in the auxiliary mobility device according to various exemplary embodiments of the present disclosure.

Figure 6:
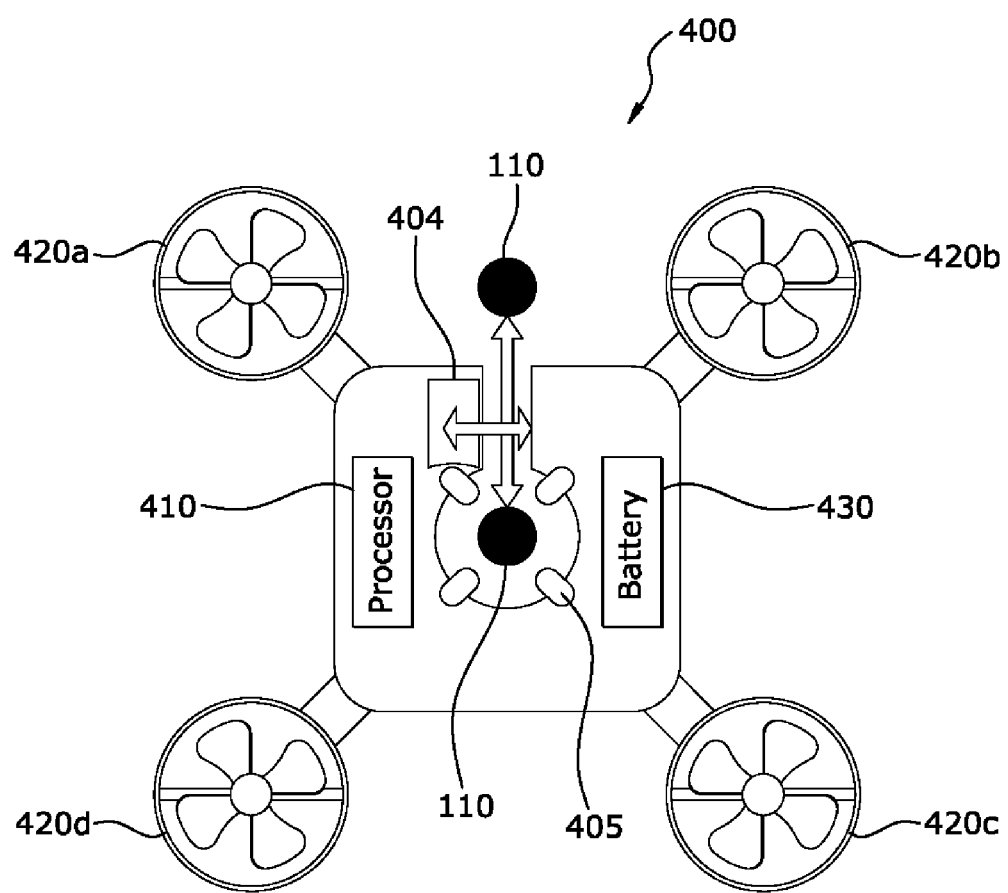
FIG. 6, FIG. 7, FIG. 8, FIG. 9 and FIG. 10 are diagrams illustrating an operation of mounting a power cable on the auxiliary mobility device according to various exemplary embodiments of the present disclosure.
Figure 7:
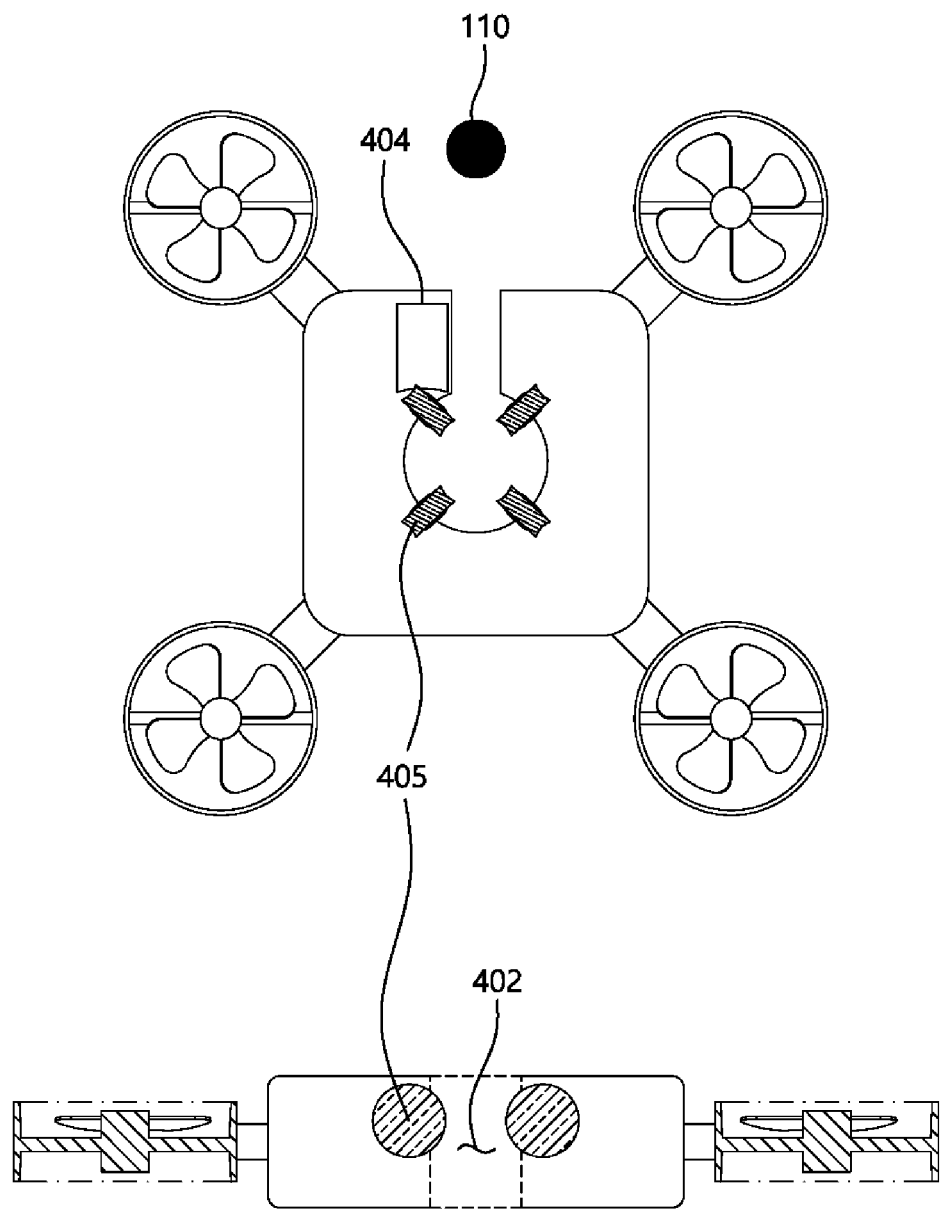

Referring to FIG. 6 and FIG. 7, the auxiliary mobility device 400 may open the lead-in/lead-out door 404 so that the power cable 110 is accommodated or loaded thereon.

The auxiliary mobility device 400 may control the propulsion unit 420 to access the power cable 110 and open the lead-in/lead-out door 404 so that the power cable 110 is accommodated thereinto. The lead-in/lead-out door 404 may be opened under the control of the processor 410.

In the instant case, the fixing roller 405 may be in a state in which it is provided in the cable penetration portion 402.

Figure 8:
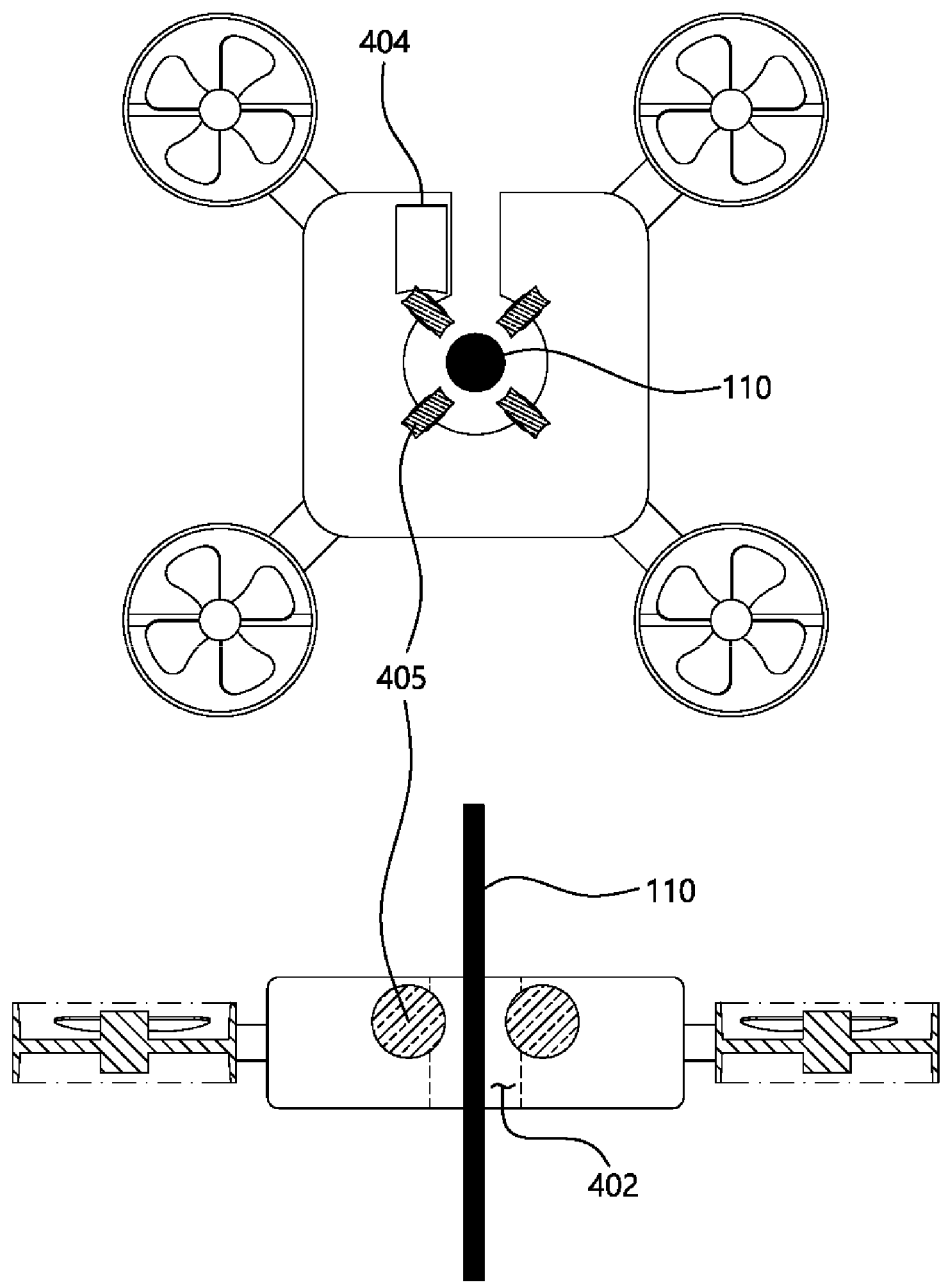

Referring to FIG. 6 and FIG. 8, the auxiliary mobility device 400 may allow the power cable 110 to be accommodated in or accommodated into the cable penetration portion 402 through the cable lead-in/lead-out portion 403.

Here, the lead-in/lead-out door 404 may continuously maintain an open state. Furthermore, the fixing roller 405 may also be provided in the cable penetration portion 402.

Figure 9:
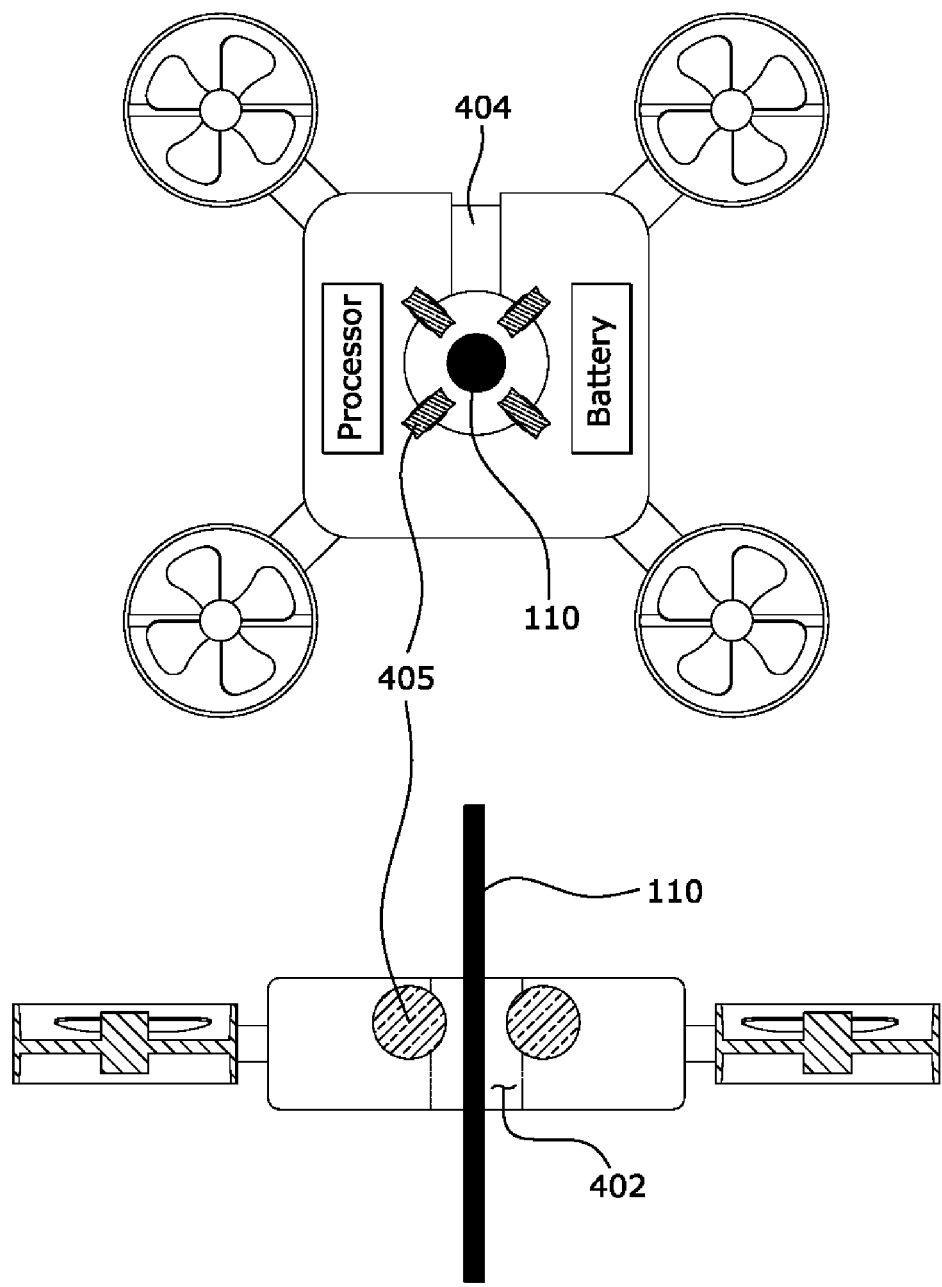

Referring to FIG. 6 and FIG. 9, the auxiliary mobility device 400 may close the open lead-in/lead-out door 404 when the power cable 110 is accommodated in or accommodated into the cable penetration portion 402. In the present manner, the power cable 110 accommodated on the auxiliary mobility device 400 may be prevented from being arbitrarily separated from the auxiliary mobility device 400 by closing the lead-in/lead-out door 404.

When the lead-in/lead-out door 404 is closed, the fixing roller 405 may act on the power cable 110 accommodated in the cable penetration portion 402 under the control of the processor 410.

Figure 10:
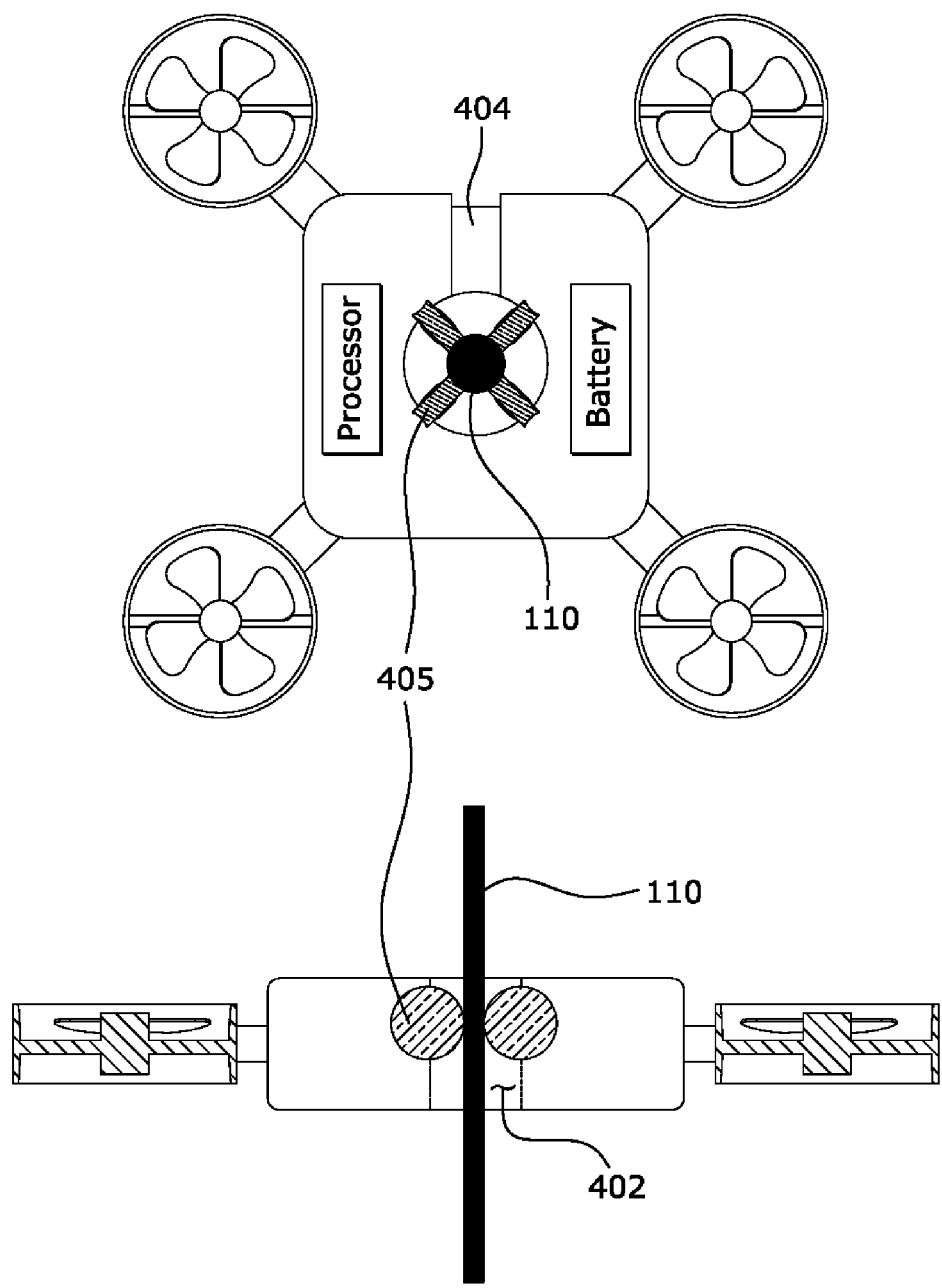

Referring to FIG. 6 and FIG. 10, the auxiliary mobility device 400 may fix the power cable 110 using the fixing roller 405. The auxiliary mobility device 400 may control the fixing roller 405 to adjust the strength or force for fixing the power cable 110.

The auxiliary mobility device 400 may determine or predict a path of the power cable 110 by collecting wind information and the like provided from the UAM power supply mobility device 300 or the charging station 100 and ascend and descend based on the predicted path of the power cable 110. Accordingly, the auxiliary mobility device 400 may control the fixing roller 405 to adjust the strength or force for fixing the power cable 110 in consideration of surrounding conditions or weather conditions in the sky.

Figure 11A:
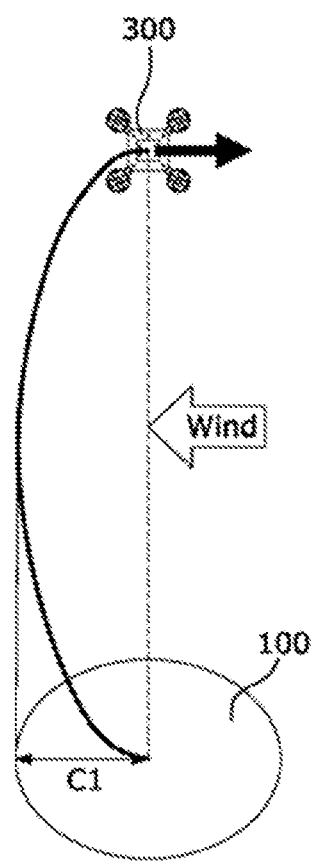
Figure 11C:
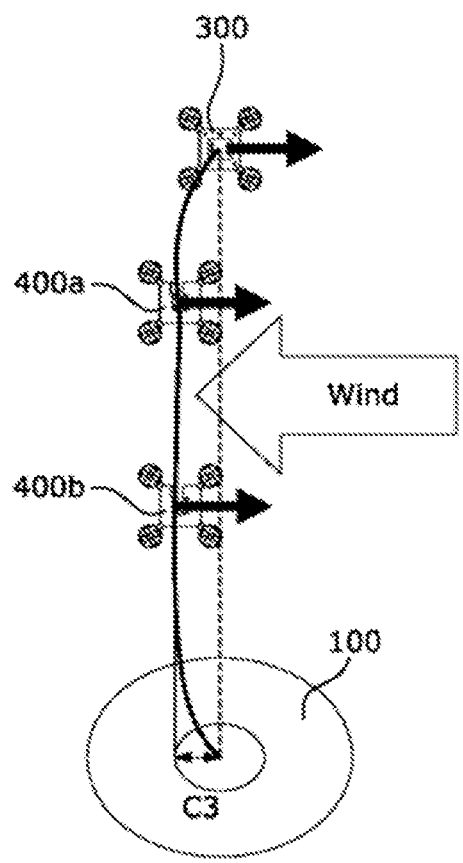

FIG. 11A, FIG. 11B and FIG. 11C are diagrams illustrating operations of a plurality of auxiliary mobility devices according to various exemplary embodiments of the present disclosure.

As shown in FIG. 11A, the UAM power supply mobility device 300 according to various exemplary embodiments of the present disclosure may ascend or descend while controlling the power cable 110 so that it does not deviate from a preset space based on a location state of the UAM power supply mobility device 300. The preset space may be a ground area where the charging station 100 is provided and an area above the charging station 100.

The UAM power supply mobility device 300 may collect information on a location state or an operating state in real time and determine or predict wind information in the preset space based on the collected information. For example, the wind information may include a wind direction or a wind strength.

When wind blows over the charging station 100 or a platform, the power cable 110 and the UAM power supply mobility device 300 flow in the opposite direction to the wind. In the instant case, the power cable 110 and the UAM power supply mobility device 300 may collide with other facilities or interfere with a route of another UAM device in a nearby charging station 100.

Accordingly, when wind blows in a first direction, the UAM power supply mobility device 300 may descend by operating the propulsion in a second direction opposite to the first direction while simultaneously operating the propulsion in the upward direction thereof.

On the other hand, as shown in FIG. 11B and FIG. 11C, the charging station 100 may also allow the auxiliary mobility device 400 to fly when the power cable 110 is beyond a predetermined range although the UAM power supply mobility device 300 operates the propulsion in the opposite direction to the wind.

The charging station 100 may receive flight information, position information, and wind information from the UAM power supply mobility device 300 and determine whether to allow at least one auxiliary mobility device 400 to fly to control the path of the power cable 110.

Here, the charging station 100 may receive weather information from an external server that can provide weather related information, such as the Meteorological Administration, analyze the information, and determine flight of at least one auxiliary mobility device 400 based on processed data. The at least one auxiliary mobility device 400 may include a first auxiliary mobility device 400a and a second auxiliary mobility device 400b.

For example, the charging station 100 may control the first auxiliary mobility device 400a so that the first auxiliary mobility device 400a pulls the power cable 110 in the middle portion of the power cable 110 in the opposite direction to the direction in which the wind blows to prevent the power cable 110 from deviating with a predetermined distance or more when a path (route) of the power cable 110 from the charging station 100 to the UAM power supply mobility device 300 deviates by a predetermined value a max or more due to the wind. The charging station 100 may be referred to as a ground platform.

Furthermore, when the charging station 100 controls the power cable 110 such that it does not deviate beyond a predetermined space or a predetermined range in the charging station 100 due to wind, if it is impossible to cause the power cable to be provided within a predetermined range using the first auxiliary mobility device 400, the charging station 100 may control the first auxiliary mobility device 400a and the second auxiliary mobility device 400b such that the power cable 110 is pulled in the middle portion of the power cable 110 using the additional second auxiliary mobility device 400b in the opposite direction to the direction in which the wind blows.

The first auxiliary mobility device 400a or the second auxiliary mobility device 400b for pulling the power cable 110 may continuously control the propulsion force and propulsion direction such that the power cable 110 does not deviate from the charging station 100 due to the wind.

The first auxiliary mobility device 400a or the second auxiliary mobility device 400b may move upwards from the ground to a predetermined altitude along the power cable 110 and then may be separated from the power cable 110 with a predetermined distance and fixed, and a force may be applied thereto in the opposite direction to the wind such that the power cable 110 does not deviate by a predetermined range or more.

Furthermore, the power cable 110 may be accommodated into the first auxiliary mobility device 400a or the second auxiliary mobility device 400b on the ground, the first auxiliary mobility device 400a or the second auxiliary mobility device 400b with the power cable 110 accommodated thereinto may move upward to a set altitude along the power cable 110, and when the first auxiliary mobility device 400a or the second auxiliary mobility device 400b reaches the set altitude, the power cable and the first auxiliary mobility device 400a or the second auxiliary mobility device 400b may be fixed and the path of the power cable 110 may be controlled.

Figure 12:
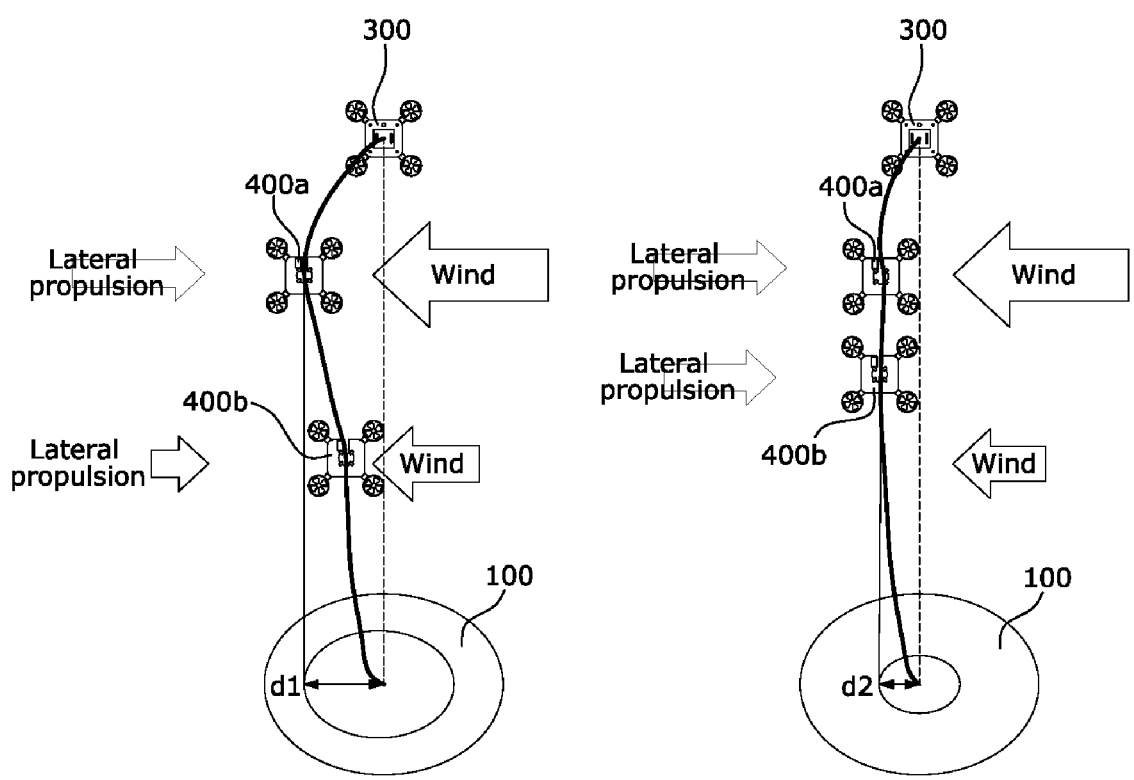
FIG. 12 is a diagram illustrating operations of a plurality of auxiliary mobility device according to various exemplary embodiments of the present disclosure.

FIG. 12 is a diagram illustrating operations of a plurality of auxiliary mobility devices according to various exemplary embodiments of the present disclosure.

As illustrated in FIG. 12, when the strength of the wind varies according to altitude, the altitude of the first auxiliary mobility device 400a or the second auxiliary mobility device 400b may be changed.

When the first auxiliary mobility device 400a and the second auxiliary mobility device 400b are provided to control the path of the power cable, the strength of the wind may be different depending on the altitude.

When the first auxiliary mobility device 400a and the second auxiliary mobility device 400b provided to control the path of the power cable are uniformly provided, it may be difficult to pull the power cable beyond a set range or more using the first auxiliary mobility device 400a located in a place where the wind blows strongly.

As a result, it is necessary to provide more auxiliary mobility devices 400 at the altitude where the wind blows strongly. However, it is difficult to check the strength of the wind for each altitude in advance.

To solve the present problem, the first auxiliary mobility device 400a and the second auxiliary mobility device 400b may share information on the magnitude of propulsion of each of the first auxiliary mobility device 400a and the second auxiliary mobility device 400b for power cable path control and set a path such that more second auxiliary mobility devices 400b are located closer to the first auxiliary mobility device 400a having a large lateral propulsion.

The first auxiliary mobility device 400a and the second auxiliary mobility device 400b may include a GPS and an altimeter for flight control.

A large lateral propulsion action means generation of a larger propulsion for path control due to strong wind. As a result, the strength of wind may be indirectly estimated from information on the lateral propulsion.

Figure 13:
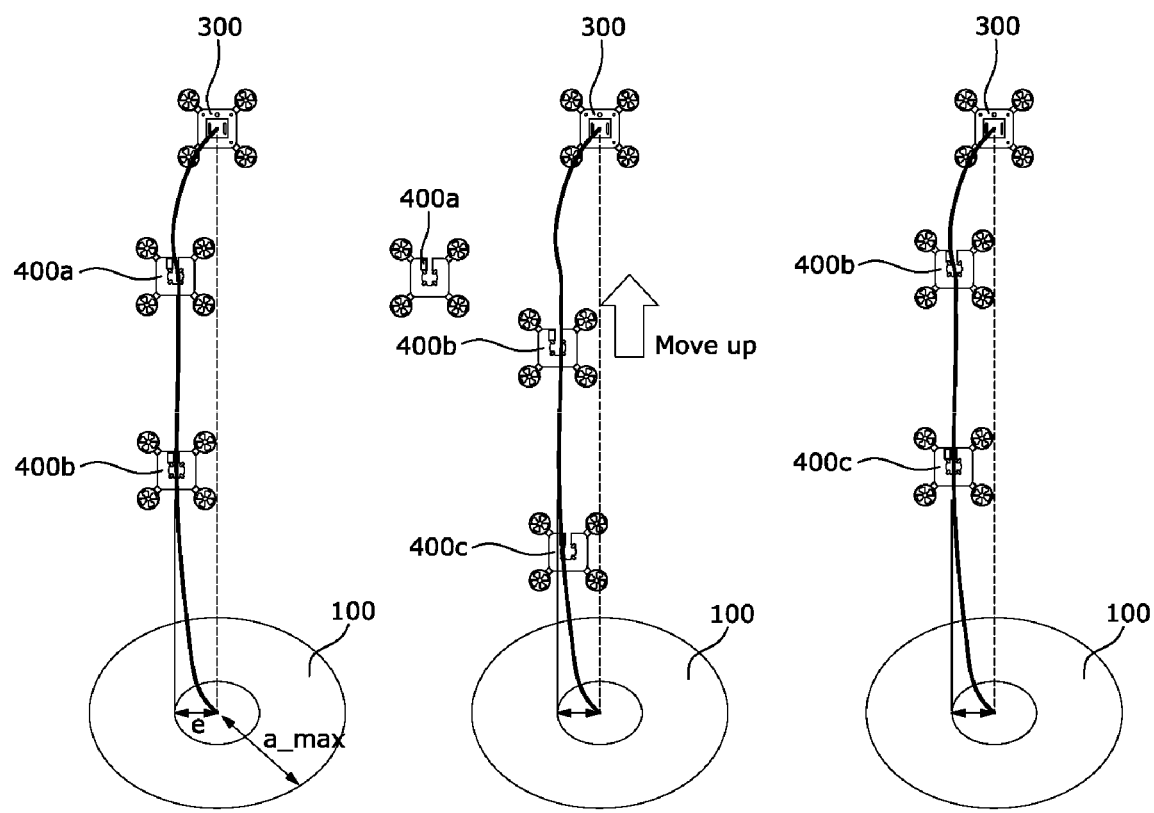
FIG. 13 is a diagram illustrating operations of a plurality of auxiliary mobility device according to various exemplary embodiments of the present disclosure.

FIG. 13 is a diagram illustrating operations of a plurality of auxiliary mobility devices according to various exemplary embodiments of the present disclosure.

Referring to FIG. 13, the additional first auxiliary mobility device 400a or the second auxiliary mobility device 400b may include a battery mounted therein and may be separated from/connected to the power cable 110 as necessary.

The first auxiliary mobility device 400a or the second auxiliary mobility device 400b may be separated from the power cable 110 and returned to the charging station 110 as necessary.

Upon determining that it is difficult to control the path of the power cable 110 due to insufficient battery power during the operation of the first auxiliary mobility device 400a or the second auxiliary mobility device 400b, the charging station 100 may perform control such that the first auxiliary mobility device 400a is separated from the power cable 110 and returned to the ground and another third auxiliary mobility device 400c replaces the insufficient first auxiliary mobility device 400a.

The charging station 110 may readjust the altitudes of the first auxiliary mobility device 400a to the third auxiliary mobility device 400c such that the path of the power cable 110 may be selectively controlled when the first auxiliary mobility device 400a to the third auxiliary mobility device 400c are separated/additionally provided.

When the UAM power supply mobility device 300 gradually lowers the altitude thereof to return to the charging station 100, the altitudes of the first auxiliary mobility device 400a to the third auxiliary mobility device 400c also decrease, and when the altitudes decrease below a predetermined value, one of the first auxiliary mobility device 400a to the third auxiliary mobility device 400c may be separated from the power cable 110 and returned to the charging station 100.

Among the first auxiliary mobility device 400a to the third auxiliary mobility device 400c, the auxiliary mobility device located at the lowest position may be separated from the power cable 110 first.

That is, among the first auxiliary mobility device 400a to the third auxiliary mobility device 400c, the auxiliary mobility device including an altitude lowered below a predetermined value may be separated from the power cable 110 first and returned to the charging station 100.

FIG. 14 is a diagram illustrating the operation of an auxiliary mobility device according to various exemplary embodiments of the present disclosure.

Referring to FIG. 14, the operation of the auxiliary mobility device according to various exemplary embodiments of the present disclosure is as follows.

First, upon determining that the auxiliary mobility device needs to be provided for power cable path control, the auxiliary mobility device may be operated. In the instant case, the auxiliary mobility device may be connected to the power cable on the ground.

Thereafter, the power cable lead-in/lead-out door may be opened to connect the auxiliary mobility device to the power cable (S110) and the power cable may be accommodated into the center portion of the auxiliary mobility device (S120).

Upon completion of insertion of the power cable into the center portion of the auxiliary mobility device, the power cable lead-in/lead-out door may be closed so that the power cable is not separated (S130).

After closing the lead-in/lead-out door, the auxiliary mobility device may move up along the power cable up to a set height for controlling the power cable (S140).

Upon reaching the set height, the auxiliary mobility device may be fixed to the power cable (S150), and the propulsion and propulsion direction of the auxiliary mobility device may be controlled so that the path of the power cable does not deviate by a predetermined range or more to control the path of the power cable (S160). The auxiliary mobility device may be referred to as an auxiliary power drone assist (APDA).

If the UAM power supply mobility device gradually descends for landing during power cable path control, the auxiliary mobility device may also descend. At the instant time, when the altitude of the auxiliary mobility device decreases below a set value H 1 (S170), fixing of the auxiliary mobility device to the power cable may be released (S180), and the auxiliary mobility device may open the cable lead-in/lead-out door (S190) to be separated from the cable (S200).

Thereafter, the auxiliary mobility device may close the cable lead-in/lead-out door (S210) and return to the ground (S220).

Upon determining that it is difficult to control the path of the power cable because the SOC value of the battery of the auxiliary mobility device decreases during power cable path control (S230), fixing of the auxiliary mobility device to the power cable may be released (S180) and the auxiliary mobility device may return to the ground (S220).

At the present time, when a single auxiliary mobility device is separated from the power cable, another auxiliary mobility device may be additionally provided on the ground (S240) so that the path of the power cable may be smoothly controlled.

The path of the power cable may be effectively controlled by readjusting the altitudes of the additionally provided auxiliary mobility device and the existing auxiliary mobility device (S250).

The present disclosure described above may be implemented as computer-readable code on a medium in which a program is recorded. A computer-readable medium includes all kinds of recording devices in which data readable by a computer system is stored. Examples of the computer-readable medium include a Hard Disk Drive (HDD), a solid state drive (SSD), a silicon disk drive (SDD), a ROM, a RAM, a CD-ROM, a magnetic tape, a floppy disk, an optical data storage device, etc.

Therefore, the above detailed description may not be construed as restrictive in all respects but as exemplary. The scope of the present disclosure may be determined by reasonable interpretation of the appended claims, and all modifications within the equivalent scope of the present disclosure are included in the scope of the present disclosure.

In the power supply system for a UAM device according to at least various exemplary embodiments of the present disclosure configured as described above, when the UAM power supply mobility device floats in the sky, the auxiliary mobility device fixes the power cable so that the power cable is not moved by the wind to prevent the power cable from deviating by a predetermined range from the charging station, improving stability.

Furthermore, in the power supply system for a UAM device according to at least various exemplary embodiments of the present disclosure, when the wind is strong and thus it is difficult to control the path of the power cable by the UAM power supply mobility device alone, at least one auxiliary mobility device is additionally provided to control the path of the power cable, achieving stable system operation.

Furthermore, the power supply system for a UAM device according to at least various exemplary embodiments of the present disclosure may use at least one auxiliary mobility device for power cable path control, and thus the number of auxiliary mobility devices to be used may be selectively set according to the strength of wind.

Furthermore, the terms such as "unit", "module", etc. included in the specification mean units for processing at least one function or operation, which may be implemented by hardware, software, or a combination thereof.

For convenience in explanation and accurate definition in the appended claims, the terms "upper", "lower", "inner", "outer", "up", "down", "upwards", "downwards", "front", "rear", "back", "inside", "outside", "inwardly", "outwardly", "interior", "exterior", "internal", "external", "forwards", and "backwards" are used to describe features of the exemplary embodiments with reference to the positions of such features as displayed in the figures. It will be further understood that the term "connect" or its derivatives refer both to direct and indirect connection.

The foregoing descriptions of predetermined exemplary embodiments of the present disclosure have been presented for purposes of illustration and description. They are not intended to be exhaustive or to limit the present disclosure to the precise forms disclosed, and obviously many modifications and variations are possible in light of the above teachings. The exemplary embodiments were chosen and described in order to explain certain principles of the invention and their practical application, to enable others skilled in the art to make and utilize various exemplary embodiments of the present disclosure, as well as various alternatives and modifications thereof. It is intended that the scope of the present disclosure be defined by the Claims appended hereto and their equivalents.

What is claimed is:

1. A power supply system for an urban air mobility (UAM) device, the power supply system comprising:
   a charging station provided on the ground and including a power cable for supplying power;
   a UAM power supply mobility device configured to be anchored at the charging station and provided with the power to charge a battery therein or to supply the power to the UAM device separated from the charging station using the power cable while flying with the UAM device; and
   at least one auxiliary mobility device configured to control a path of the power cable to keep the power cable in a preset space while flying between the charging station and the UAM power supply mobility device.

2. The power supply system of claim 1, wherein the charging station is configured to determine the path of the power cable according to position information and flight information of the UAM power supply mobility device, received from the UAM power supply mobility device, and to determine whether the at least one auxiliary mobility device flies based on the determined path of the power cable.

3. The power supply system of claim 2, wherein the charging station is configured to control the at least one auxiliary mobility device to fly to control the path of the power cable upon determining that the power cable deviates from the preset space.

4. The power supply system of claim 3, wherein the at least one auxiliary mobility device includes:
   a body including a predetermined internal space;
   a propulsion unit provided on a circumferential surface of the body and operated to allow the at least one auxiliary mobility device to fly;
   a processor configured to control flight of the at least one auxiliary mobility device so that the power cable is accommodated into the at least one auxiliary mobility device;

a communication module configured to receive position information of the charging station from the charging station or receive the flight information and the position information of the UAM power supply mobility device from the UAM power supply mobility device and to transmit flight information and position information of the at least one auxiliary mobility device to the charging station or the UAM power supply mobility device; and a battery configured to charge the power supplied from the charging station under control of the processor.

5. The power supply system of claim 4, wherein the at least one auxiliary mobility device further includes:
    a cable penetration portion formed by penetrating a portion of the body in a vertical direction to arrange the power cable therein;
    a cable lead-in/lead-out portion physically connected to the cable penetration portion and formed to lead in or lead out the power cable;
    a lead-in/lead-out door formed in the cable lead-in/lead-out portion to open or close the cable lead-in/lead-out portion under control of the processor; and
    a fixing roller provided in the cable penetration portion to selectively fix the power cable accommodated into the cable penetration portion.

6. The power supply system of claim 1,
    wherein the at least one auxiliary mobility device includes a first auxiliary mobility device, a second auxiliary mobility device and a third auxiliary mobility device, and
    wherein the charging station is configured to control to sequentially fly the second auxiliary mobility device and the third auxiliary mobility device when the power cable leaves the preset space while controlling the path of the power cable using the first auxiliary mobility device.

7. The power supply system of claim 6, wherein the first auxiliary mobility device moves up to a predetermined height along the power cable and is provided at a first interval from the second auxiliary mobility device.

8. The power supply system of claim 7, wherein the second auxiliary mobility device moves up to a preset height along the power cable and resets the predetermined height in response to a strength of wind and adjusts the first interval based on a reset height.

9. The power supply system of claim 8, wherein the charging station is configured to control the first auxiliary mobility device so that the first auxiliary mobility device is separated from the power cable and returned to the charging station when a state of charge (SOC) value of a battery in the first auxiliary mobility device is lower than a preset state of charge.

10. The power supply system of claim 8, wherein the charging station additionally provides the third auxiliary mobility device configured for the power cable when the first auxiliary mobility device is separated from the power cable and controls the preset height of the second auxiliary mobility device into which the power cable is accommodated to be reset.

11. The power supply system of claim 6, wherein the charging station is configured to control the first auxiliary mobility device, the second auxiliary mobility device, and the third auxiliary mobility device to move down when the UAM power supply mobility device moves down to land at the charging station.

12. The power supply system of claim 11, wherein the charging station performs control so that, among the first auxiliary mobility device, the second auxiliary mobility device and the third auxiliary mobility device, an auxiliary mobility device at a lowest position is separated from the power cable first.

13. A method for supplying power to a urban air mobility (UAM) device while the UAM device is separated from a charging station and takes off, the method comprising:
    electrically connecting a UAM power supply mobility device to the UAM device;
    allowing the UAM power supply mobility device to take off so that the UAM power supply mobility device flies along with the UAM device separated from the charging station;
    supplying power to the UAM device using a power cable mounted between the charging station and the UAM power supply mobility device ascending with the UAM device until reaching a position in a preset space; and
    controlling a path of the power cable to keep the power cable in the preset space during the flight between the charging station and the UAM power supply mobility device.

14. The method of claim 13, wherein the controlling a path of the power cable includes:
    determining the path of the power cable according to position information and flight information of the UAM power supply mobility device, received from the UAM power supply mobility device; and
    determining whether at least one auxiliary mobility device flies based on the determined path of the power cable.

15. The method of claim 14, wherein the controlling a path of the power cable further includes controlling the at least one auxiliary mobility device to fly to control the path of the power cable upon determining that the power cable deviates from the preset space.

16. The method of claim 15, wherein the controlling a path of the power cable further includes receiving position information of the charging station from the charging station or receiving the flight information and the position information of the UAM power supply mobility device from the UAM power supply mobility device or transmitting flight information and position information of the at least one auxiliary mobility device to the charging station or the UAM power supply mobility device.

17. The method of claim 16,
    wherein the at least one auxiliary mobility device includes a first auxiliary mobility device, a second auxiliary mobility device and a third auxiliary mobility device,
    wherein the controlling a path of the power cable further includes controlling the second auxiliary mobility device and the third auxiliary mobility device to sequentially fly when the power cable leaves the preset space while controlling the path of the power cable using the first auxiliary mobility device.

18. The method of claim 17, wherein the controlling a path of the power cable further includes controlling the first auxiliary mobility device and the second auxiliary mobility device to move up to a predetermined height along the power cable and disposing the first auxiliary mobility device and the second auxiliary mobility device at a first interval.

19. The method of claim 18, wherein the controlling a path of the power cable further includes:
    controlling the second auxiliary mobility device to move up to a preset height along the power cable and resets the predetermined height in response to a strength of wind; and
    adjusting the first interval based on a reset height.

20. The method of claim 19, wherein the controlling a path of the power cable further includes controlling the first auxiliary mobility device so that the first auxiliary mobility device is separated from the power cable and returned to the charging state when a state of charge (SOC) value of a battery in the first auxiliary mobility device is lower than a preset state of charge.

21. The method of claim 19, wherein the controlling a path of the power cable further includes:
   additionally providing the third auxiliary mobility device for the power cable when the first auxiliary mobility device is separated from the power cable; and
   resetting the preset height of the second auxiliary mobility device into which the power cable is accommodated.

22. The method of claim 17, wherein the controlling a path of the power cable further includes controlling the first auxiliary mobility device, the second auxiliary mobility device, and the third auxiliary mobility device to move down when the UAM power supply mobility device moves down to land at the charging station.

23. The method of claim 22, wherein the controlling a path of the power cable further includes performing control so that, among the first auxiliary mobility device, the second auxiliary mobility device and the third auxiliary mobility device, an auxiliary mobility device at a lowest position is separated from the power cable first.

* * * * *